(12) United States Patent
Etchepare et al.

(10) Patent No.: US 12,479,762 B2
(45) Date of Patent: Nov. 25, 2025

(54) METHOD FOR DEALKALISATION OF BOROSILICATE GLASS CONTAINERS BY LIQUID MEANS

(71) Applicant: SGD S.A., Puteaux (FR)

(72) Inventors: Pierre-Luc Etchepare, Rouen (FR); Christophe Depoilly, Aigneville (FR); Jingwei Zhang, Massy (FR)

(73) Assignee: SGD S.A., Puteaux (FR)

( * ) Notice: Subject to any disclaimer, the term of this patent is extended or adjusted under 35 U.S.C. 154(b) by 0 days.

(21) Appl. No.: 17/624,773

(22) PCT Filed: Jul. 10, 2020

(86) PCT No.: PCT/FR2020/051255
§ 371 (c)(1),
(2) Date: Jan. 4, 2022

(87) PCT Pub. No.: WO2021/005318
PCT Pub. Date: Jan. 14, 2021

(65) Prior Publication Data
US 2022/0242784 A1  Aug. 4, 2022

(30) Foreign Application Priority Data
Jul. 11, 2019 (FR) ..................................... 1907826

(51) Int. Cl.
*C03C 23/00* (2006.01)
(52) U.S. Cl.
CPC ................................ *C03C 23/008* (2013.01)

(58) Field of Classification Search
CPC .................................................. C03C 23/008
See application file for complete search history.

(56) References Cited

U.S. PATENT DOCUMENTS 2,033,076 A * 3/1936 Howard .................... C03B 9/14
65/80
2,947,117 A   8/1960 Greene et al.
(Continued)

FOREIGN PATENT DOCUMENTS

| CA | 773057 | 12/1967 |
|---|---|---|
| CN | 102320759 | 1/2012 |

(Continued)

OTHER PUBLICATIONS

Translation of FR2700764 (Year: 1994).*
(Continued)

*Primary Examiner* — Cynthia Szewczyk
(74) *Attorney, Agent, or Firm* — Nath, Goldberg & Meyer; Joshua B. Goldberg

(57) ABSTRACT

The invention relates to a method for dealkalisation of the inside surface (5) of the wall (2) of a glass container (1), which wall (2) defines a cavity (3) and an opening (4) providing access to the cavity (3), the method comprising a step of providing a container made of borosilicate glass, wherein the inside surface of the wall is at a temperature of at least 350° C., and a step of introducing into the cavity, the inside surface being at a temperature of at least 350° C., a (Continued)

treatment liquid containing a substance designed to react under the effect of heat to cause dealkalisation of the glass. Methods for treating glass containers.

19 Claims, 3 Drawing Sheets

(56) References Cited

U.S. PATENT DOCUMENTS

| | | | | |
|---|---|---|---|---|
| 3,281,225 A | * | 10/1966 | Hazdra | C03C 21/007 65/30.13 |
| 2012/0040193 A1 | | 2/2012 | Rajala | |
| 2021/0114921 A1 | | 4/2021 | Depoilly et al. | |
| 2022/0267203 A1 | | 8/2022 | Etchepare et al. | |

FOREIGN PATENT DOCUMENTS

| | | | | |
|---|---|---|---|---|
| CN | 106955833 A | * | 7/2017 | B05B 12/18 |
| CN | 207188400 | | 4/2018 | |
| EP | 1106510 A1 | | 6/2001 | |
| EP | 3192587 | | 7/2017 | |
| EP | 3997043 B1 | | 4/2023 | |
| FR | 912609 A | | 8/1946 | |
| FR | 2697014 | | 4/1994 | |
| FR | 2700764 A1 | * | 7/1994 | C03C 23/00 |
| FR | 3078329 A1 | | 8/2019 | |
| FR | 3098512 A1 | | 1/2021 | |
| GB | 563091 | | 7/1944 | |
| GB | 948309 | | 1/1964 | |
| JP | 2001294447 A | | 10/2001 | |
| WO | 2015/170198 | | 11/2015 | |
| WO | 2019166719 A1 | | 9/2019 | |
| WO | 2021005317 A1 | | 1/2021 | |

OTHER PUBLICATIONS

Translation of JP 2001-294447 (Year: 2001).*
Translation of CN 106955833 (Year: 2017).*
Search Report and Written Opinion dated Oct. 9, 2020 issued in corresponding International Application No. PCT/FR2020/051255.
Slideshow presentation on "Increase of the hydrolitical resistance of glass by an online treatment of glass surfaces after glass forming" held by M. Mathias Hoztel CEO of LubriGlass GmbH on May 31, 2017 during the "Glastechnische tagung der DGG" at Weimar Germany.
Additional statement from M. Mathias Hoztel regarding precedent document, Dec. 18, 2023.
Extract of a web page https//en.wikipedia.org/wiki/Sodium_bisulfate, 2024.
Written submission in preparation of oral proceedings received Sep. 10, 2025, for application No. EP 20753396.9.
Programme of 91st Glass Technology Conference, May 28-31, 2017, Germany.
Extracts of Perry's Chemical Engineers' Handbook - fifth/eighth edition.
Declaration signed by Mr. Hessenkemper.

* cited by examiner

METHOD FOR DEALKALISATION OF BOROSILICATE GLASS CONTAINERS BY LIQUID MEANS

This is a National Phase Application filed under 35 U.S.C. 371 as a national stage of PCT/FR2020/051255, filed Jul. 10, 2020, an application claiming the benefit of French Application No. FR1907826, filed Jul. 11, 2019, the content of each of which is hereby incorporated by reference in its entirety.

TECHNICAL FIELD

The invention relates to the general technical field of methods for the treatment of glass containers, and more specifically the technical field of methods for the dealkalization treatment of the inner wall of glass containers, such as for example containers forming pharmaceutical glass primary packaging.

PRIOR ART

In the field of pharmaceutical glass primary packaging, the purpose is to propose containers, in particular of the vial type, that have an excellent chemical compatibility with the product or preparation they are intended to contain. Indeed, the aim is to prevent any harmful interaction between a species from the glass forming the container and the product contained by the latter.

In this respect, it is known to subject containers made of soda-lime-silica glass (or "Type III" glass), before their use, to a dealkalization treatment that consists in extracting, over a depth of several dozens of nanometres, the alkaline ions—and in particular the sodium ions—present in the vicinity of the surface of the inner wall of the container, and evacuating them, in order to avoid as much as possible the elution of the alkaline ions over time into the product contained by the container. Such a treatment is generally carried out by introducing into a glass container to be treated a solid or gaseous reactive substance that is capable, under the action of heat, to generate an acid gas liable to chemically react with the alkaline ions present in the glass of the container.

A dealkalization treatment method is known, which consists in introducing into a hot glass container ammonium sulphate $(NH_4)_2SO_4$ in solid form, for example in the form of a crystalline powder or tablets. Under the effect of heat, the ammonium sulphate sublimates and forms a gas that reacts with the sodium contained in the glass in the immediate vicinity of the inner surface of the container treated. The sodium so extracted from the glass is then deposited at the surface of the inner wall of the container in the form of a residual powder compound of sodium sulphate $Na_2SO_4$, which can then be removed by washing. It is also known, according to a similar reaction principle, a dealkalization treatment method that consists in introducing into a glass container, while the latter is upstream from or within the annealing arch, sulphur dioxide SO2 or sulphur trioxide SO3 in gaseous form.

Such known dealkalization methods nevertheless have a number of drawbacks. Indeed, if the use of a powder reactive substance allows glass containers to be treated at a relatively high rate, thanks to a continuous dispensing of a powder reactive substance into containers in motion on a conveyor, there exists a significant risk of deposition and reaction of the reactive substance on the outer wall of the container, and in particular on the ring of the latter, which leads to aesthetic defects, or even to a local weakening of the container. Moreover, it is difficult to accurately control the dose of reactive substance really introduced into the container, unless oversizing the quantity of reactive substance dispensed, which is not without economical and environmental consequences. The use of a solid reactive substance in tablet form generally allows a more accurate dispensing of the reactive substance into the containers. However, it is often difficult, or even impossible, to efficiently treat that way containers of small volume and/or small ring diameter, and especially at high rates. On the other hand, the implementation of sulphur dioxide $SO_2$ or sulphur trioxide $SO_3$ in gaseous form poses significant health, environmental and technical problems, given the toxic and corrosive nature of these gases. Moreover, the dealkalization treatment of the glass is not always carried out in a sufficiently uniform and repeatable manner, and the level of chemical (or hydrolytic) resistance of the treated container remains perfectible.

Soda-lime-silica glass containers treated that way are conventionally said of "Type II". Their mechanical strength, and in particular their level of hydrolytic resistance provided by the treatment, make them suitable for the storage and preservation of a large number of pharmaceutical products and substances.

However, when it turns out that the chemical resistance of such known "Type II" containers is insufficient to allow a storage and preservation in good conditions of certain pharmaceutical products and substances known to be particularly aggressive and/or unstable with respect to the glass of the containers in which they are contained, it is also known to use containers made of borosilicate glass (or "Type" or "neutral" glass). Indeed, if they are generally more expensive than "Type II" glass containers, the "Type I" glass containers have intrinsically an excellent chemical resistance due in particular to their lower alkaline or alkaline-earth oxide content. However, it turns out that the performances of such "Type I" glass containers in terms of chemical resistance sometimes remain themselves insufficient to allow a storage and preservation in optimum conditions of certain pharmaceutical products and substances extremely aggressive or sensitive with respect to the elements contained in the glass of the containers.

That is the reason why it has been proposed to subject borosilicate glass containers to a treatment of internal siliconization, in such a way as to cover the inner surface of the containers with a protective silicone layer. Such a treatment makes it possible to improve the chemical resistance of a borosilicate glass container to certain basic products (pH10, for example), but, in some other cases, it offers no particular advantage with respect to an uncoated borosilicate glass container. Moreover, such an internal siliconization treatment may turn out to be complex and expensive to implement, and the deposited silicone layer generally begins to deteriorate above 350° C., which may be a problem when the container treated is intended to undergo a subsequent high temperature sterilization step. Moreover, the resistance of the deposited silicone layer remains dependent on the chemical composition of the contained product, and in particular on the dissolving power of the latter on silicone, which thus limits the field of application of the siliconized glass containers.

It has also been proposed to coat the inner surface of containers made of drawn "Type" glass with a thin layer of pure silica $SiO_2$, in such a way as to form a barrier layer between the glass of a container and the product contained in this latter. Such silica-coated containers generally have a satisfying chemical resistance for the storage of ultra-pure water, but a low to moderate chemical resistance for more aggressive solutions, pH8 or pH10, for example. Relatively expensive and complex to implement, the deposition of a pure-silica barrier layer is moreover generally limited to containers of small capacity.

DISCLOSURE OF THE INVENTION

The objects assigned to the present invention therefore aim to remedy the different drawbacks listed hereinabove, and to propose a new dealkalization method that allows obtaining glass containers of any size and capacity, having an excellent chemical resistance to a wide range of products and substances to be stored and preserved.

Another object of the invention aims to propose a new dealkalization method that allows treating efficiently a large number of glass containers, and that at very high rates.

Another object of the invention aims to propose a new dealkalization method that allows treating glass containers in a particularly reliable and repeatable manner.

Another object of the invention aims to propose a new dealkalization method that allows treating efficiently glass containers without thereby degrading the mechanical strength thereof.

Another object of the invention aims to propose a new dealkalization method, whose implementation is particularly simple and economical.

The objects assigned to the invention are achieved by means of a method for dealkalizing the inner face of the wall of a glass container, such as a vial, which wall delimits an accommodation cavity for a product, said method being characterized in that it comprises:
 a step of supplying a borosilicate glass container, the inner face of the wall of which is at a temperature of at least 350° C., and
 a step of introducing into said accommodation cavity, with said inner face being at a temperature of at least 350° C., a treatment liquid containing a treatment substance designed to react under the effect of the heat from the inner face of the container wall to bring about dealkalization of the glass.

BRIEF DESCRIPTION OF THE DRAWINGS

Other features and advantages of the invention will appear in more detail upon reading of the following description, with reference to the appended drawings, given by way of purely illustrative and non-limitative examples, in which.

WAYS TO IMPLEMENT THE INVENTION

Figure 1:
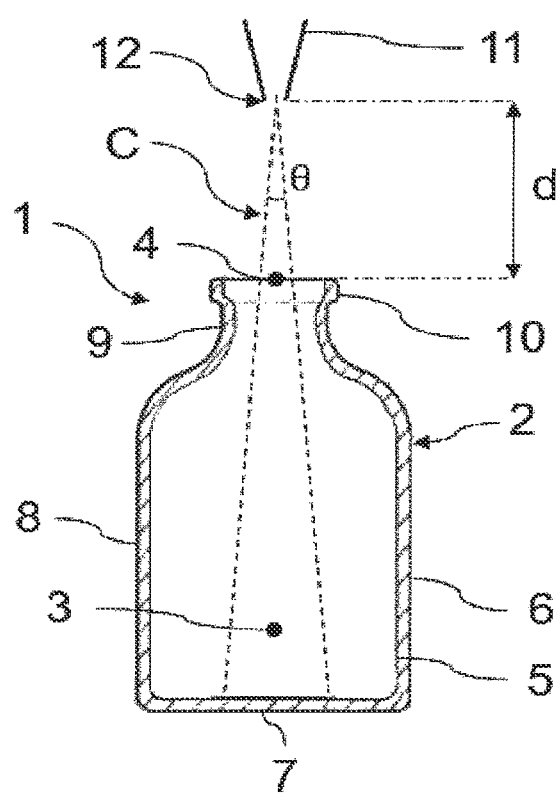
FIG. 1 schematically illustrates an example of glass container of the vial type subjected to a step of introducing a treatment liquid into its cavity, in accordance with a preferential embodiment of the dealkalization method according to the invention.

The invention relates to a method for treating a glass container 1, such as a vial, comprising a wall 2 delimiting an accommodation cavity 3 for a product (or a substance). Advantageously, the wall 2 also delimits an opening 4 providing access to the accommodation cavity 3 of the container 1. The glass wall 2 of the container 1 has a lower face 5, located facing said accommodation cavity 3 and preferentially intended to come into direct contact with said product, and an opposite outer face 6. Preferentially made of moulded or drawn glass, and formed of a single, monolithic piece of glass, the container 1 the invention relates to may have any shape adapted to its function, such as for example the shape of a vial or a bottle. As illustrated by way of example in FIG. 1, the wall 2 of the container 1 is advantageously formed by a glass bottom 7, a glass lateral wall 8 that rises from the periphery of the bottom 7, and a neck 9 provided with a ring 10 that delimits the opening 4 of the container 1, to allow the accommodation cavity 3 to be put in communication with the outside. Advantageously, said opening 4 is designed so as to be able to be closed by a removable or pierceable plug or membrane seal.

Preferably, the product intended to be received into the cavity 3 of the container 1 is advantageously fluid, i.e. likely to flow like, for example, a liquid, pasty (such as a liquid with a high degree of viscosity) or powder substance. Preferably, it is a pharmaceutical product or a substance, such as for example a medication, potentially intended to be administered by parenteral route (general or locoregional) or to be ingested or absorbed by a patient, or also a diagnostic substance, as for example a chemical or biological reagent. By extension, the container 1 can be designed to contain a biological substance (or body fluid), such as for example blood, a blood product or by-product, urine, etc. Even if the application to the pharmaceutical and diagnostic fields is preferred, the invention is however not limited to pharmaceutical and diagnostic containers and may in particular also relate to a container designed to contain a liquid, pasty or powder substance for industrial (storage of chemical products, etc.), veterinary, food or also cosmetic use.

More specifically, the method according to the invention is a method for dealkalizing the inner face 5 of the wall 2 of such a glass container 1. Such a dealkalization method aims to extract, typically over a depth of several dozens of nanometres, the alkaline and/or alkaline-earth ions (and in particular the sodium ions) present in the glass in the vicinity of the surface of the inner face 5 of the wall 2 of the container 1. At the end of the method according to the invention, the glass in the vicinity of the surface of the inner face 5 of the wall 2 of the treated container 1 is thus, preferably significantly, depleted in alkaline and/or alkaline-earth ions.

In the sense of the invention, the word "glass" refers to a mineral glass. It is typically a glass containing at least one alkaline or alkaline-earth species, such as sodium in particular. More specifically, it is a borosilicate glass (called "Type I" glass, according notably to the European and American Pharmacopoeias, or "neutral" glass). Typically, a borosilicate glass (or borosilicated glass or also borosilicate-based glass) is a silica glass that advantageously contains between 7% and 13%, for example between 10% and 13%, in mass of boron trioxide ($B_2O_3$). By comparison with a soda-lime-silica glass (called "Type III" glass), a borosilicate glass, of Type I, has intrinsically a better hydrolytic resistance insofar as the borosilicate glass contains a lower proportion of alkaline or alkaline-earth species, in particular sodium. That is the reason why the borosilicate glass containers are generally not subjected to a dealkalization treatment.

Preferentially, the glass constituting the wall 2 of the container 1 is transparent (or at least translucent) in the visible domain. It may be either a colourless glass or a coloured glass, for example to protect the fluid substance in the container against the effects of light, in particular in certain wavelength ranges (UV, etc.).

Firstly, the method according to the invention comprises a step of supplying a borosilicate glass container 1 as described hereinabove, (at least) the inner face 5 of the wall 2 of which is at a temperature of at least 350° C., preferably between 350° C. and 850° C., preferably between 350° C. and 800° C., preferably between 350° C. and 700° C., preferably between 500° C. and 700° C., and still preferably between 500° C. and 650° C. The container 1 so supplied is a pre-existing container, fully formed, which thus advantageously has its definitive shapes and sizes. It is hence not a glass preform (such as for example a tube) intended to be lately transformed into a container.

As an alternative, this supply step comprises an operation of heating, using any known suitable heating means, a pre-existing borosilicate glass container as described hereinabove and whose wall inner face is initially at a temperature close (if not equal) to the ambient temperature, in order to heat it in such a way that the temperature of at least the inner face of its wall reaches a value of at least 350° C., preferably between 350° C. and 850° C., preferably between 350° C. and 800° C., preferably between 350° C. and 700° C., preferably between 500° C. and 700° C., and still preferably between 500° C. and 650° C. According to another, more preferential alternative, the step of supplying the container 1 comprises an operation of collecting a glass container 1 as described hereinabove at the exit of a machine for hot forming a borosilicate glass container from a glass preform, while said container 1 is still hot enough so that (at least) the inner face 5 of the wall 2 of the container 1 is at a temperature of at least 350° C., preferably between 350° C. and 850° C., preferably between 350° C. and 800° C., preferably between 350° C. and 700° C., preferably between 500° C. and 700° C., and still preferably between 500° C. and 650° C. According to this preferential alternative, the method according to the invention thus does not require the implementation of a particular heating operation, the inner face 5 of the wall 2 of the container 1 being heated to a temperature of at least 350° C., preferably between 350° C. and 850° C., preferably between 350° C. and 800° C., preferably between 350° C. and 700° C., preferably between 500° C. and 700° C., and still preferably between 500° C. and 650° C., as a direct consequence of a previous forming operation of said container 1. Such a forming operation can be carried out using any known borosilicate glass container forming installation, such as for example an IS machine in the case of a container made of moulded glass. The implementation of the method according to the invention is thus simplified, in particular when the latter is implemented in an industrial context of manufacture of glass containers.

The method according to the invention also comprises a step of introducing into the accommodation cavity 3 of the container 1 to be treated, with the inner face 5 of the wall 2 of the latter being at a temperature of at least 350° C., preferably between 350° C. and 850° C., preferably between 350° C. and 800° C., preferably between 350° C. and 700° C., preferably between 500° C. and 700° C., and still preferably between 500° C. and 650° C., a treatment liquid containing a treatment substance (or dealkalization substance) designed to react under the effect of the heat from the inner face 5 of the wall 2 of the container 1 to bring about dealkalization of the glass, typically in the vicinity of the surface of the inner face 5 of the wall 2. It may be a substance that, as such, is capable of coming into direct contact with the hot inner face 5 of the wall 2 of the container 1 to react, under the effect of heat, with one or several alkaline species present in the glass forming the wall 2 of the container 1 or also a substance capable of decomposing under the effect of the heat inside the cavity 3 of the container, due to the above-mentioned temperature to which the inner face 5 of the wall 2 is heated, to produce one or several new chemical species or substances, which are capable of coming into contact with the surface of the inner face 5 of the wall 2 of the container 1 and reacting with one or several alkaline or alkaline-earth species present in the glass forming said wall 2 in order to obtain the desired effect of dealkalization.

The invention is hence based on the idea of subjecting to a dealkalization treatment the inner face 5 of the wall 2 of a container 1 made of borosilicate glass (Type I), and not of soda-lime-silica glass (Type III), by introducing into the container 1 a heat reactive dealkalization substance, this dealkalization substance being introduced in liquid phase (and not in solid or gaseous phase), and that with the inner face 5 of the wall 2 of the container 1 being at a temperature at which said dealkalization substance is likely to react immediately under the effect of heat to bring about dealkalization of the glass.

It has been observed that the fact to introduce the treatment substance, what's more in liquid phase, into a container 1 already heated to the treatment temperature (i.e. a temperature included in the above-mentioned temperature ranges) makes it possible to obtain far better performances, in particular in terms of homogeneity of the dealkalization treatment of the inner face 5 of the wall 2 of the container 1 and of hydrolytic resistance of the so-treated container 1, than when the same treatment substance is introduced into a cold container 1 before the latter is heated to the treatment temperature to make said treatment substance react under heat.

Thanks to such a particular combination of features, the method according to the invention makes it possible to obtain glass containers 1 that have a significantly better hydrolytic resistance than that of the conventional known Type I or Type II glass containers, and that, independently of the size and capacity of the considered containers. The method according to the invention thus makes it possible to obtain glass containers 1 having an excellent chemical resistance to a wide range of products and substances to be stored and preserved.

It is commonly admitted that, over a long period of manufacture of conventional Type I borosilicate glass containers, the performances of these latter, in terms of hydrolytic resistance, are not always perfectly stable, identical. Indeed, over one year of manufacture, the value of the hydrolytic resistance of borosilicate glass containers coming from a same glass production line is likely to vary by a few tens of percent, while remaining in full compliance with the applicable Pharmacopoeia. Now, it has surprisingly been observed that the method according to the invention makes it possible to obtain borosilicate glass containers 1 whose performances in terms of hydrolytic resistance are not only far better than those of glass containers 1 not treated according to the invention, but are also more stable, more reproducible, over time than those of conventional borosilicate glass containers.

Moreover, it has also been observed that, very interestingly, the method according to the invention makes it possible to obtain containers 1 having far better performances in terms of quantity of elements, other than alkaline or alkaline earth species, likely to be extracted from the glass by interaction with a product contained in the containers 1. In particular, it has notably been advantageously measured, for containers 1 treated in accordance with the invention, significantly lower quantities of aluminium released in comparison with quantities measured reciprocally on containers made of untreated borosilicate glass (measurement of concentrations of extractable species, after having maintained the containers to be tested during 1 h in autoclave at 121° C. with ultra-pure water).

Preferably, said treatment substance comprises a sulphur compound, and still preferably a compound containing sulphur combined with oxygen, in solution or in suspension in a volatile liquid, i.e. in a liquid likely to evaporate under the effect of heat, and at least at temperatures of at least 350° C., preferably between 350° C. and 850° C., preferably between 350° C. and 800° C., preferably between 350° C. and 700° C., preferably between 500° C. and 700° C., and still preferably between 500° C. and 650° C. Advantageously, this volatile liquid can be a solvent of said compound.

Still more preferentially, said sulphur compound is an ammonium sulphate, and said volatile liquid is preferably water. It is then preferentially in this case demineralised water or, still more preferentially, ultra-pure water. The ammonium sulphate is then advantageously at least partially (and preferably totally) dissolved in water, in a predefined concentration.

Apart from the fact that the production, the storage and the implementation of such a treatment liquid are relatively easy, safe and inexpensive, it has been observed that excellent results in terms of hydrolytic resistance of the glass can further be obtained using such a treatment liquid formed of ammonium sulphate dissolved in water. In particular, very good results have been obtained for glass containers 1 the inner face 5 of the wall 2 of which is at a temperature preferentially between 500° C. and 700° C., and more preferentially between 500° C. and 650° C., during the step of introducing the treatment liquid. These results could be explained by a phenomenon of absorption of the water molecules evaporated under the effect of heat, which facilitates or improves the dealkalization treatment of the glass by the ammonium sulphate. However, the invention is of course not limited to this example of treatment substance and volatile liquid, and other substances and volatile liquids can actually be used to obtain the desired effect of dealkalization by reaction with the glass under the effect of heat. For example, the treatment substance may comprise a sulphur compound formed of gaseous sulphur dioxide or trioxide, which would then be dissolved in the liquid solvent (volatile liquid), or also a mixture of a sulphur compound and a fluorine compound. In these cases also, the volatile liquid may advantageously be water (preferably, demineralised water and, still more preferentially, ultra-pure water), both for practicality and safety of implementation and for questions of treatment efficiency, as mentioned above.

As already mentioned hereinabove, the container 1 the method according to the invention relates to is preferentially made of moulded or drawn glass. However, it is still more advantageous that the container 1 is made of moulded glass, and not of drawn glass (i.e. manufactured from a preform, such as a tube, made of drawn glass). For example, such a moulded glass container 1 can be obtained by a "blow-and-blow" or "press-and-blow" process, for example using an IS machine. Indeed, it has been observed that a drawn glass container, and what's more made of borosilicate glass, suffers intrinsically, due to its forming method, from an increased risk of delamination (that is to say a risk of detachment of glass flakes or particles from the surface of the inner face of the container wall by interaction of the glass with the product contained in the container) with respect to a moulded glass container. The risk of delamination is even greater when the container has been subjected to a dealkalization treatment. Now, the presence of free particles of glass in a product, in particular a pharmaceutical product, may have very serious health consequences. By thus preferentially implementing a moulded borosilicate glass container 1, the method according to the invention advantageously allows obtaining a treated container 1 that has not only an excellent hydrolytic resistance (control of the risk of elution of alkaline and alkaline-earth ions into the product contained in the container) but also an excellent resistance to delamination by interaction of the glass with the product contained in the container. The so-obtained container is hence particularly safe.

Preferably, the step of introducing the treatment liquid into the accommodation cavity 3 of the container 1 to be treated comprises at least one operation of injecting, into said cavity 3, a predetermined dose of said treatment liquid. Still more preferentially, said injection operation is made using an injection head (or nozzle) 11, which is located at a distance from the opening 4 of the container 1 to be treated and outside said container 1. Thus, the injection head 11 does not enter the cavity 3 of the container 1 during, or for the purpose of, said injection operation. In a preferential embodiment, and as schematically illustrated in FIG. 1, said injection head 11 is thus advantageously located facing the opening 4 of the container 1, and above said opening 4, the container 1 being positioned vertically, with its bottom 7 directed towards the ground. Advantageously, said injection operation is then carried out in such a way as to inject said predetermined dose of treatment liquid as a spray cone C that is narrow enough relative to the opening 4 of the container 1 for substantially all of said predetermined dose to end up inside the cavity 3 of the container 1 at the end of said injection operation. When the injection head 11 is located facing and at a distance from the opening 4 of the container 1, said spray cone C hence advantageously has a cross-section, included in a plane in which the opening 4 of the container 1 is inscribed, whose size is lower than that of said opening 4 of the container 1 in said plane. As schematically illustrated in FIG. 1, the spray cone C generated by the injection head 11 can then advantageously have a (dummy) base of size lower, and preferably far lower, than that of the opening 4 of the container 1, in such a way that all of the predetermined dose of treatment liquid (to within the potential unavoidable but nevertheless negligible losses) can be injected into the cavity 3 of the container 1, and hence with substantially no dispersion of treatment liquid next to the container 1 or on the outer face 6 of the wall 2 and the ring 10 of the latter. It will be noted that, in the context of the invention, "spray cone" is not to be considered according to a strict mathematical definition of the term "cone", but preferentially mean a dummy envelope (whether conical, frustoconical, or even ideally substantially cylindrical) inside which is contained substantially all the predetermined dose of treatment liquid sprayed by the injection head 11 towards the cavity 3 of the container 1, as illustrated in dotted line in FIG. 1.

Said predetermined dose of treatment liquid advantageously corresponds to an also predetermined and known dose of treatment substance, insofar as, on the one hand, the volume of the predetermined dose of treatment liquid sprayed by the injection head 11, and on the other hand, the (mass or molar) concentration of treatment substance in the treatment liquid, are known. Thus, according to the quantity of treatment substance required to obtain the desired level of dealkalization (advantageously characterized by a measurement of the hydrolytic resistance HR of the container glass according to the usual measurement protocols) for a container 1 of given size, it is advantageously possible either to modulate the volume of the predetermined dose for a fixed and known concentration of treatment substance, or on the contrary to modulate the concentration of treatment substance for a known and fixed volume of the predetermined dose, or also, as will be seen hereinafter, to repeat the injection operation.

The particular combination of the feature of temperature of the inner face 5 of the wall 2 of the container 1 to be treated, on the one hand, and the above-mentioned preferential technical features of the step of introducing the treatment liquid into the cavity 3 of the container 1 thus advantageously makes it possible to dealkalize borosilicate glass containers 1 in a particularly efficient manner, whatever their size and capacity, and that at very high rates when the method according to the invention is applied successively to a plurality of borosilicate glass containers 1. Indeed, it is not necessary to proceed to cycles of insertion and removal of the injection head 11 into, and from, the cavity 3 of containers 1 to be treated, in order to treat a plurality of containers successively brought facing the injection head 11. Moreover, the method according to the invention is particularly economical, clean and environmentally friendly because it allows avoiding any overdose of treatment substance and the useless dispersion of a quantity of this treatment substance outside the container to be treated.

It is desirable that the injection head 11 is not located too close to the container 1 to be treated during the operation of injecting said predetermined dose of treatment liquid, in order in particular to avoid the injection head 11 to be damaged by the heat from the container 1. On the other hand, it is preferable that the injection head 11 is not either located at a too great distance d from the opening 4 of the container 1, in order in particular not to degrade the accuracy of the injection operation and to facilitate the practical implementation thereof. Finally, it is advisable to choose the distance d between the injection head 11 and the opening 4 of the container 1 in such a way as to limit the risk of evaporation of the treatment liquid, under the effect of the heat from the container 1, even before the dose has been able to fully enter the cavity 3 of the container 1. As such, during the operation of injecting said predetermined dose of treatment liquid, the injection head 11 may be advantageously located substantially facing the opening 4 of the container 1 (as contemplated hereinabove) and at a distance d preferentially between 1 cm and 20 cm, and still more preferentially between 1 cm and 5 cm, from said opening 4 during the injection step. This distance d is here preferentially understood as the average distance measured in straight line between, on the one hand, the outlet 12 of the injection head 11 (through which the predetermined dose of treatment liquid exits from the injection head 11) and a plane containing the opening 4 of the container 1, as illustrated in FIG. 1.

In order to facilitate the injection, in accordance with the above, of all the predetermined dose of treatment liquid into the cavity 3 of the container 1 to be treated, the spray cone C of said predetermined dose of treatment liquid is formed, by the injection head 4, in such a way as to preferentially have an apex angle (or opening angle) e substantially between 0° and 5°. Still more preferentially, the apex angle θ of the spray cone is substantially between 0° and 1°, in such a way that the predetermined dose of treatment liquid is advantageously injected into the cavity 3 of the container 1 as a cylindrical or almost-cylindrical dummy envelope.

Thus, if, at the exit of the injection head 11, the predetermined dose of the treatment liquid is for example in the form of a plurality of treatment liquid droplets, more or less distinct from each other, these latter can then form, between the injection head 11 and the cavity 3 of the container 1, a substantially rectilinear trickle or jet of treatment liquid.

Preferentially, and whatever the arrangement chosen for the injection head 11 during the injection operation, the volume of the predetermined dose of treatment liquid injected by the injection head 11 is chosen substantially between 5 µL and 50 µL, and preferably between 5 µL and 30 µL, which advantageously allows limiting the risk of damage to the container 1 by thermal shock when the treatment liquid enters into contact with the hot inner face 5 of the wall 2 of the container 1. Moreover, the choice of such a limited volume of treatment liquid helps to facilitate the injection of all the predetermined dose of treatment substance into the cavity 3 of the containers 1 to be treated, and that even at very high rates, in the case where the head is preferentially located at a distance from the opening 4 of the container 1 to be treated and outside the latter during the injection operation.

Preferentially, the treatment liquid has a predefined concentration of said treatment substance in solution that it close (if not equal) or just below the saturation concentration. In other words, the treatment liquid contains said treatment substance, which is substantially totally dissolved in a liquid, and preferably a volatile liquid as mentioned hereinabove, in a quantity close or just below the maximum quantity able to be dissolved in the considered liquid for a chosen temperature of implementation of the treatment liquid. The predetermined concentration thus advantageously corresponds to the highest possible concentration of treatment substance, without exceeding the saturation concentration. Typically, the predefined concentration is hence substantially between about 70% and 100% of the saturation concentration, preferably between about 80% and 100% of the saturation concentration, still preferably between about 90% and 100% of the saturation concentration for a chosen temperature of implementation of the treatment liquid. That way, it is advantageously possible to introduce into the container 1, an optimum quantity of treatment substance in the smallest possible volume of treatment liquid introduced. When the treatment liquid is introduced as a predetermined dose of treatment liquid, as contemplated hereinabove, it is thus possible to introduce into the container 1, a predetermined dose of treatment liquid that contains an optimum quantity of treatment substance in the smallest possible volume of predetermined dose. That way, the quality of the dealkalization treatment is optimized while limiting the risk of damage to the container 1 by thermal shock when the treatment liquid enters into contact with the hot inner face 5 of the wall 2 of the container 1. Maintaining a concentration of treatment substance lower than or equal to the saturation concentration advantageously makes it possible to guarantee an excellent reproducibility of the quantity of treatment substance introduced into the container 1, and also to limit the risk of clogging of the injection head 11 when the treatment substance is a solid substance, dissolved in a volatile liquid to form the treatment liquid (risk of precipitation). For example, when the treatment liquid comprises a ammonium sulphate (treatment substance) dissolved in water (volatile liquid), as already contemplated hereinabove, the predefined concentration of ammonium sulphate in the treatment liquid may generally be between about 0.1 g/mL and about 1 g/mL, according in particular to the temperature of implementation of the treatment liquid and the desired level of hydrolytic resistance. However, in view of the above, it is therefore more advantageous that the predefined concentration of dissolved ammonium sulphate in the treatment liquid is between about 0.5 g/mL and about 0.8 g/mL for a temperature of the treatment liquid between about 0° C. and about 40° C., and preferably between about 10° C. and about 40° C. The predefined concentration of dissolved ammonium sulphate in the treatment liquid could go up to about 1 g/mL for a temperature of the treatment liquid of about 90° C.

Although the method according to the invention can be of interest for treating a container 1 that remains stationary relative to the injection head 11 during the injection operation, the injection operation of the method according to the invention is advantageously carried out while the container 1 to be treated is in motion relative to the injection head 11, preferably at a speed of at least 25 m per minute, still preferably at least 30 m per minute, and still preferably up to 40 m per minute, so that in particular a plurality of containers 1 can be treated using the injection head 11 at a particularly high rate. According to an alternative, the injection head 11 moves, during the injection operation, relative to the container 1 to be treated, which is itself held stationary (in the earth reference system). According to another, more preferential alternative, the injection head 11 is on the contrary held stationary (in the earth reference system), while the container 1 to be treated moves relative to the injection head 11, for example on a conveyor positioned under and facing the injection head 11.

In the particular case in which the injection operation of the method according to the invention is hence advantageously carried out while the container 1 to be treated is in motion relative to the injection head 11, the method according to the invention preferentially comprises a step of detecting the presence of the container 1 upstream from the injection head 11 (considering the direction of relative movement of the injection head 11 and the container 1), previously to the injection operation, to synchronize the triggering of the injection operation with the arrival of the container 1 at the injection head 11, and preferably facing the outlet 12 of the latter. Indeed, knowing the speed of movement of the container 1 relative to the injection head 11, and on the basis of a detection signal, generated during the detection step, of the presence of the container 1 at a known distance downstream from the injection head 11, it is hence advantageously possible to trigger the injection of the predetermined dose by the injection head 11 at the precise moment when the container 1 is positioned facing the outlet 12 of the injection head 11, and preferably just in alignment therewith.

Advantageously, the step of introducing the treatment liquid into the accommodation cavity 3 of the container 1 may comprise a plurality of successive operations of injection of said predetermined dose of said treatment liquid. Indeed, it may be necessary, according to the size of the glass container 1 to be treated, to implement a significant quantity of treatment substance to achieve the desired dealkalization level, without having to use for that purpose predetermined doses of treatment liquid of significant volumes, which could lead to a high risk of thermal shocks detrimental to the mechanical strength of the container 1. If it is conceivable, as discussed hereinabove, to increase the quantity of treatment substance by playing on the concentration of the latter in the treatment liquid, it may thus also be advantageously contemplated (as a complement or as an alternative) to subject several times a same glass container 1 to the injection operation of the method according to the invention by implementing, at each iteration, a predetermined dose of treatment liquid of limited volume (for example, between 5 µL and 50 µL, and preferably between 5 µL and 30 µL, as mentioned hereinabove). In such a case, said injection operation can then be carried out, for example, using a single and same injection head 11, the container 1 then remaining preferentially stationary (at least temporarily) facing the injection head 11. As an alternative, said injection operation could be carried out using a plurality of distinct injection heads 11, positioned for example one after the other along a path of movement of the container 1.

In order to further improve the repeatability and the reliability of the dealkalization treatment, by taking into account potential variations of weather conditions, the method according to the invention preferably comprises, previously to the step of introducing a treatment liquid into the cavity 3 of the container 1, an operation of regulating and controlling the temperature of the treatment liquid in order to make sure that this temperature remains substantially constant over time, and advantageously equal to a predefined setpoint temperature. Therefore, the treatment liquid, and preferably said predetermined dose of the latter, is injected into the cavity 3 of the container 1 at an advantageously predefined temperature, which is then substantially identical for each container 1 to be treated according to the method of the invention.

As an alternative or as a complement, the method according to the invention may comprise, previously to the step of introducing the treatment liquid into the cavity 3 of the container 1, an operation of preheating the treatment liquid (typically to a temperature higher than the ambient temperature), in such a way as to reduce the difference between the temperature of the treatment liquid, and preferably of said predetermined dose of the latter, injected during the injection operation, and the temperature of the inner face 5 of the wall 2 of the container 1 to be treated. This makes it possible in particular to further reduce the risk of thermal shock during the treatment of the container 1, and hence the risk of damage to the latter.

The method according to the invention may advantageously comprise, after the step of introducing the treatment liquid into its cavity 3, a step of transferring the so-treated container 1 to a glass container annealing device, such as a conventional industrial annealing arch, in order to advantageously subject the treated container 1 to an annealing step.

The installation 13 for treating a glass container 1, intended for implementing the above-described method according to the invention, will now be described. It is thus advantageously an installation 13 for dealkalizing the inner face 5 of the wall 2 of such a borosilicate glass container 1, which wall 2 delimits an accommodation cavity 3 for a product and an opening 4 providing access to said accommodation cavity 3. The above description related to the method according to the invention remains valid and applicable, mutatis mutandis, to the present installation 13, and vice versa. It is preferentially an industrial installation, advantageously automated. Still more preferentially, said installation 13 is designed to treat in a substantially uninterrupted manner a large number of containers 1. A preferential embodiment of the installation 13 is schematically illustrated by way of example in FIGS. 2 and 3.

The installation 13 comprises a means 14 for supplying a borosilicate glass container 1, as described hereinabove, (at least) the inner face 5 of the wall 2 of which is at a temperature of at least 350° C., preferably between 350° C. and 850° C., preferably between 350° C. and 800° C., preferably between 350° C. and 700° C., preferably between 500° C. and 700° C., and still preferably between 500° C. and 650° C. According to an alternative, this supply means comprises a heating means, of any known suitable type (for example, of the arch or oven type), designed to heat a pre-existing borosilicate glass container as described hereinabove and the inner face of the wall of which is initially at a temperature close (if not equal) to the ambient temperature, in such a way that the temperature of at least the inner face of the container wall reaches a value of at least 350° C., preferably between 350° C. and 850° C., preferably between 350° C. and 800° C., preferably between 350° C. and 700° C., preferably between 500° C. and 700° C., and still preferably between 500° C. and 650° C. According to another, more preferential alternative, the means 14 for supplying the container 1 comprises a system 15 for collecting a borosilicate glass container 1 as described hereinabove at the exit of a machine 16 for hot forming a glass container from a glass preform, while said container 1 is still hot enough so that (at least) the inner face 5 of the wall 2 of said container 1 is at a temperature of at least 350° C., preferably between 350° C. and 850° C., preferably between 350° C. and 800° C., preferably between 350° C. and 700° C., preferably between 500° C. and 700° C., and still preferably between 500° C. and 650° C. According to this preferential alternative, the installation 13 according to the invention thus advantageously does not comprise a specific heating means for heating the container 1, the inner face 5 of the wall 2 of the container 1 being heated to a temperature of at least 350° C., preferably between 350° C. and 850° C., preferably between 350° C. and 800° C., preferably between 350° C. and 700° C., preferably between 500° C. and 700° C., and still preferably between 500° C. and 650° C., as a direct consequence of a previous forming operation of said container 1 by said forming machine 16. As mentioned hereinabove in relation with the method according to the invention, this machine or installation 16 for forming borosilicate glass containers may be of any known forming type, such as for example an IS machine in the case of a container made of moulded glass. The collecting system 15 may, for example, comprise an arm, advantageously robotic, and/or a conveyor 17 (for example, of the belt or roll type), designed, arranged and sized to collect a glass container 1 at the exit of a forming machine 16, close enough to the latter so that (at least) the inner face 5 of the wall 2 of the container 1 is still at a temperature of at least 350° C., preferably between 350° C. and 850° C., preferably between 350° C. and 800° C., preferably between 350° C. and 700° C., preferably between 500° C. and 700° C., and still preferably between 500° C. and 650° C.

The installation 13 also comprises a means (or station) 18 for introducing into the accommodation cavity 3 of the container 1 to be treated, with the inner face 5 of the wall 2 of the latter being at a temperature of at least 350° C., preferably between 350° C. and 850° C., preferably between 350° C. and 800° C., preferably between 350° C. and 700° C., preferably between 500° C. and 700° C., and still preferably between 500° C. and 650° C., a treatment liquid containing a treatment substance (or dealkalization substance) designed to react under the effect of the heat from the inner face 5 of the wall 2 of the container 1 to bring about dealkalization of the glass, typically in the vicinity of the surface of the inner face 5 of the wall 2. The treatment liquid and substance implemented by the installation, as well as the reaction principles associated therewith, are advantageously consistent with the treatment liquid and substance described hereinabove in relation with the method according to the invention.

Preferentially, the means 18 for introducing the treatment liquid comprises at least one injection head (or nozzle or valve) 11, designed to be located (and held) at a distance from the opening 4 of the container 1 and outside the latter, and to inject (while the injection head 11 is located that way) a predetermined dose of the treatment liquid, preferably as a spray cone C that is narrow enough relative to the opening 4 of the container 1 for substantially all of said predetermined dose to end up inside the cavity 3 of the container 1. In other words, the introduction means 18 is then advantageously designed and configured to hold the injection head 11 in such a way that the latter does not enter the cavity 3 of the container 1 when the injection head 11 is in operation and injects said predetermined dose of treatment liquid into the cavity 3 of the container 1. The injection head 11 is designed to generate, at an outlet (opening) 12, said predetermined dose of treatment liquid, and to inject it, to spray it as a spray cone C having a (dummy) base of size lower, and preferably far lower, than that of the opening 4 of the container 1, as shown in FIG. 1 and described hereinabove in relation with the method according to the invention.

The particular combination of the features of the means 14 for supplying the container 1, on the one hand, and such preferential features of the means 18 for introducing the treatment liquid into the cavity 3 of the container 1 thus makes the installation 13 advantageously capable of carrying out a particularly efficient dealkalization treatment of glass containers 1, whatever their size and capacity, and that at very high rates when the installation is implemented to treat successively a plurality of glass containers 1. Moreover, the installation 13 is particularly economical, clean and environmentally friendly because it allows avoiding any overdose of treatment substance and the useless dispersion of a quantity of this treatment substance outside the container to be treated.

Figure 2:
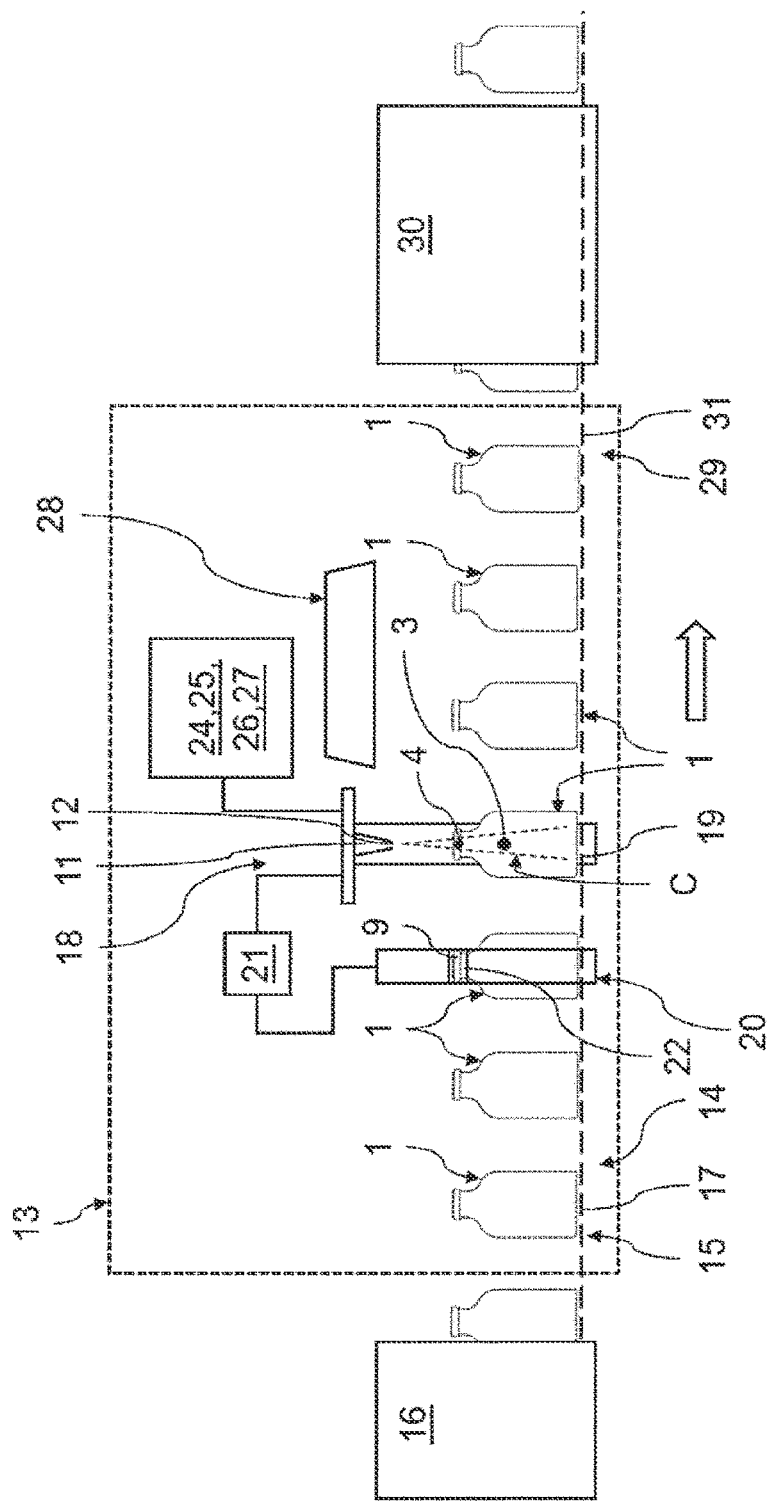
FIG. 2 schematically illustrates, in a side view, an embodiment of an installation for implementing a preferential embodiment of the dealkalization method according to the invention.

In a preferential embodiment, and as schematically illustrated in FIG. 2, the means 14 for supplying the glass container 1 to be treated is designed to bring the container 1 to the introduction means 18 in such a way that the container 1 is positioned vertically, with its bottom 7 directed towards the ground, and the introduction means 18 is designed in such a way that the injection head 11 can be located facing the opening 4 of the container 1 and above said opening 4. Advantageously, the introduction means 18 may comprise an adjustable support for adapting, preferably automatically, the position (or altitude) of the injection head 11 as a function of the size of the container(s) 1 to be treated.

Preferably, and for the reasons and advantages explained hereinabove in relation with the method according to the invention, the introduction means 18 is designed to position, and also preferably to hold, the injection head 11 substantially facing the opening 4 of the container 1 and at a distance d between 1 cm and 20 cm, and preferably between 1 cm and 5 cm, from said opening 4, when the injection head 11 is in operation, that is to say when it forms the predetermined dose and sprays it towards the cavity 3 of the container 1. This distance d is here too preferentially understood as the average distance measured in straight line between, on the one hand, the outlet 12 of the injection head 11 and a plane containing the opening 4 of the container 1, as illustrated in FIG. 1.

Preferentially, the injection head 11 is designed to generate a spray cone C of said predetermined dose of treatment liquid having an apex angle $\theta$ substantially between 0° and 5°. Still more preferentially, the injection head 11 is designed to generate a spray cone C of said predetermined dose of treatment liquid with an angle $\theta$ substantially between 0° and 1°, in such a way that the predetermined dose can be advantageously injected into the cavity 3 of the container 1 as a substantially cylindrical or almost-cylindrical dummy envelope.

In order to limit the risk of damage to the container 1 by thermal shock when the treatment liquid enters into contact with the hot inner face 5 of the wall 2 of the container 1, but also to advantageously facilitate the injection of all the predetermined dose of treatment liquid into the cavity 3 of the containers 1 to be treated, and that even at very high rates, the injection head 11 is preferentially designed in such a way that the volume of said predetermined dose of said treatment liquid is between 5 μL and 50 μL, and preferably between 5 μL and 30 μL.

According to a preferential embodiment, the injection head 11 comprises an electromechanical actuator driven by a piezoelectric device, to allow the dosing and the injection of volumes of liquid between 5 μL and 50 μL, and preferably between 5 μL and 30 μL, in response to an electric control signal. As an alternative, and in particular for higher volumes of treatment liquid to be dosed and injected, the injection head 11 may comprise, for example, an electromechanical actuator driven by a solenoid device.

Figure 3:
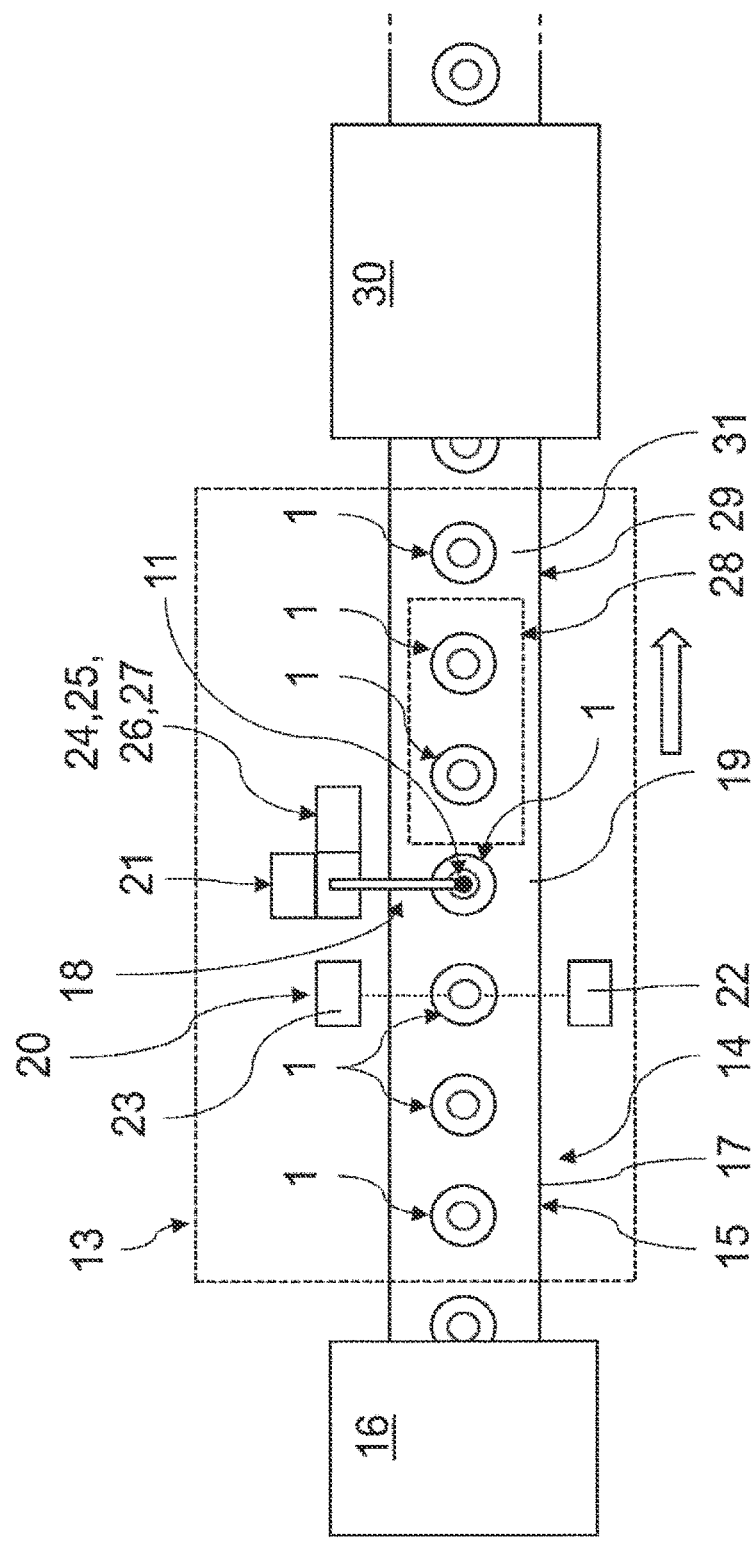
FIG. 3 schematically illustrates, in a top view, the dealkalization installation of FIG. 2.

Although the installation 13 can be of interest for treating a container 1 that remains stationary relative to the injection head 11 during the operation of the latter, the installation 13 is preferentially designed to allow a dealkalization treatment of one or several glass containers 1 in motion relative to the injection head 11, preferably at a speed of at least 25 m per minute, still preferably at least 30 m per minute, and still preferably up to 40 m per minute, so that in particular a plurality of containers 1 can be treated using the injection head 11 at a particularly high rate. According to an alternative, the installation 13 comprises, on the one hand, means for moving the injection head 11 during its operation, preferably at the above-mentioned speed, relative to the container 1, which itself remains stationary (in the earth reference system). According to a more preferential alternative, and as schematically illustrated in FIGS. 2 and 3, the installation 13 preferably comprises a conveyor 19 (for example of the belt or roll type), or any other suitable known means, designed to, adapted to, put the container(s) 1 to be treated in motion relative to the injection head 11, which is held stationary (in the earth reference system, for example "through a frame fixed to the ground"), preferably at a speed of at least 25 m per minute, still preferably at least 30 m per minute, and still preferably up to 40 m per minute. In this case, and as illustrated by way of example in FIG. 2, the conveyor 19 can then be preferentially positioned under and facing the injection head 11, with the container 1 positioned vertically, with its bottom 7 resting on the conveyor 19 and its opening 4 directed upward, in such a way that said opening 4 comes under (and preferably in alignment with) the outlet 12 of the injection head 11. Potentially, the conveyor 19 may be the same as the conveyor 17 comprised, in the example proposed hereinabove, in the system 15 for collecting the glass container 1 at the exit of a forming machine 16.

Preferentially, the installation 13 comprises a means 20 for detecting the presence of the container 1 upstream from the injection head 11, and a control unit 21 connected, mechanically or electrically, on the one hand to the detection means 20, and on the other hand to the injection head 11, to synchronize the triggering of the operation of the injection head 11 with the arrival of the container 1 at the injection head 11, and preferably facing the outlet 12 of the latter, as contemplated hereinabove in relation with the method according to the invention. For example, the detection means 20 may be of the optical barrier type and comprise either a light beam emitter (for example, of the infrared type) positioned opposite a photoelectric cell, or a detection cell 22 comprising both a light beam emitter (for example, of the infrared type) and a photoelectric cell and a light reflector 23 positioned opposite a photoelectric cell, as in the example illustrated in FIG. 3. The detection cell 22 and the reflector 23 are advantageously positioned on either side of the path of movement of the container 1, at a known distance from the injection head 11. In the absence of container 1, the detection cell 22 emits a light beam (represented in dotted line in FIG. 3), which is reflected by the reflector 23 and detected by the photoelectric cell of the detection cell 22. In this case, the control unit 21 controls the stop of the operation of the injection head 11. In the presence of a container 1, the light beam is interrupted (or at least disturbed) by the container 1, in such a way that the photoelectric cell does not detect the light beam (or detects a disturbed light beam), which signs the presence of a container 1. In this case, the control unit 21 controls, with a time delay defined according to the known speed of movement of the container 1, the triggering of the operation of the injection head 11. In a particularly advantageous manner, such a detection means 20 of the optical barrier type may be designed and arranged in such a way that the light beam emitted is interrupted by the neck 9 or the ring 10 of a container 1, and not by the body of the latter, in order to allow a finer synchronization of the operation of the injection head 11, and hence a more accurate injection of the predetermined dose of treatment liquid into the cavity 3 of the container 1, when the latter arrives at the injection head 11. Of course, other known and suitable detection means, not necessarily optical, may be contemplated.

Advantageously, the means 18 for introducing the treatment liquid may comprise a plurality of injection heads 11, or a single injection head 11 provided with a plurality of outlets 12, in order to allow the injection of a predetermined dose of treatment liquid simultaneously into the cavity 3 of a plurality of glass containers 1 (whether these latter are then in motion or not relative to the injection heads 11), and/or to allow the successive injection of several predetermined doses into the cavity 3 of a same container 1. The introduction means 18 can then comprise, for example, a plurality of distinct injection heads 11, mounted one after the other along the path of relative movement of the injection heads and the container(s) 1. As an alternative and/or a complement, the introduction means 18 may comprise a plurality of distinct injection heads 11 mounted next to each other in a direction transverse to the path of relative movement of the injection heads and the container(s) 1, in order to allow the treatment of glass containers 1 arranged in rows.

As a complement or alternative to such a means 20 for detecting the presence of the container 1 upstream from the injection head 11, the installation 13 advantageously comprises, when it is provided to treat successively or simultaneously a plurality of glass containers 1, a means for controlling the relative position and aligning the containers, upstream from the injection head(s) 11, in order to further improve the accuracy of injection of the predetermined dose of treatment liquid into the cavity 3 of the containers 1 to be treated. Such means for controlling the relative position and aligning the containers are known as such in the field of glass container treatment, so that it is not necessary to describe them here in more detail.

Advantageously, the installation 13 comprises a system 24 for preparing and/or storing the treatment liquid, upstream from the injection head 11 of the introduction means 18. This preparation and/or storage system 24 can advantageously comprise a system 25 for mixing the treatment substance and the volatile liquid, to obtain and/or preserve a perfectly homogeneous treatment liquid. In order to further improve the repeatability and the reliability of the dealkalization treatment, by taking into account potential variations of weather conditions, the installation 13 preferably comprises, and for example at the above-mentioned system 24 for preparing and/or storing the treatment liquid, a heat regulation system 26 for holding the treatment liquid at a constant predefined temperature before the latter is injected into the cavity 3 of the container 1 by the injection head 11. Advantageously, the introduction means 18 may comprise, and for example at said system 24 for processing and/or storing the treatment liquid, a system 27 for pressurizing the treatment liquid upstream from or within the injection head 11, for example at a relative pressure comprised between 0.5 bar and 4 bar.

The installation 13 may advantageously comprise, downstream from the means 18 for introducing the treatment liquid into the cavity 3 of the container 1, and preferably above the opening 4 of the container 1, one or several extraction hoods 28 to efficiently extract and evacuate the off-gases resulting from the glass dealkalization reaction. The installation 13 may advantageously comprise, downstream from the means 18 for introducing the treatment liquid into the cavity 3 of the container 1, a means 29 for transferring the treated container 1 to the entry of a glass container annealing device 30, such as a conventional industrial annealing arch 30. The transfer means 29 may, for example, comprise an arm, advantageously robotic, and/or a conveyor 31 (for example, of the belt or roll type), designed, arranged and sized to collect the treated glass container 1 at, or downstream from, the introduction means 18 and to bring it to the entry of the annealing device 30.

As understood from the above detailed description, the method according to the invention and the above-described installation for the implementation of the latter can advantageously be directly integrated to industrial borosilicate glass container production methods and line, wherein the installation in question can be positioned in a production line, between a machine for forming borosilicate glass containers and a device for annealing these latter.

Advantageously, the method according to the invention and the installation for the implementation of the latter allow the dealkalization of the inner face of the wall of a large number of borosilicate glass containers, at a rate that may be higher than 400 vials/minute in single row (a single injection head) or 800 vials/minute in dual row (two parallel rows of containers on the conveyor, two injection heads), in particular for containers of rated capacity of 5 mL to 50 mL, and that, while achieving a better hydrolytic resistance level of the treated containers than that usually achieved using known methods and installations of dealkalization by a solid or gaseous treatment substance.

POSSIBILITY OF INDUSTRIAL APPLICATION

The invention finds its application in the field of methods for the treatment of glass containers, and more specifically the technical field of methods for dealkalizing the inner wall of glass containers, such as containers forming pharmaceutical glass primary packaging.

The invention claimed is:

1. A method for dealkalizing an inner face (5) of a wall (2) of a glass container (1), which wall (2) delimits an accommodation cavity (3) for a product, said method being characterized in that it comprises:
    a step of supplying a borosilicate glass container (1), the inner face (5) of the wall (2) of which is at a temperature of at least 350° C., and
    a step of introducing into said accommodation cavity (3), with said inner face (5) being at a temperature of at least 350° C., a treatment liquid containing a treatment substance designed to react under the effect of the heat from the inner face (5) of the wall (2) of said glass container (1) to bring about dealkalization of the glass;
    wherein said glass container (1) is made of moulded glass.

2. The method according to claim 1, wherein
    said supply step is a step of supplying said borosilicate glass container (1), the inner face (5) of the wall (2) of which is at a temperature between 350° C. and 850° C.,
    said introduction step being a step of introducing said treatment liquid into said accommodation cavity (3), with said inner face (5) being at a temperature between 350° C. and 850° C.

3. The method according to claim 2, wherein the range is between 350° C. and 800° C.

4. The method according to claim 3, where the range is between 350° C. and 700° C.

5. The method according to claim 1, wherein the step of supplying said glass container (1) comprises an operation of collecting said borosilicate glass container (1) at the exit of a machine for hot forming a borosilicate glass container from a glass preform, with said glass container (1) being still hot enough so that the inner face (5) of the wall (2) is at a temperature of at least 350° C.

6. The method according to claim 1, wherein said treatment liquid has a predefined concentration of said treatment substance in solution that is between 70% and 100% of a saturation concentration for a chosen temperature of implementation of the treatment liquid.

7. The method according to claim 1, wherein said step for introducing said treatment liquid comprises at least one operation of injecting a predetermined dose of said treatment liquid.

8. The method according to claim 7, wherein a volume of said predetermined dose of treatment liquid is chosen between 5 µL and 50 µL.

9. The method according to claim 7, wherein the wall (2) of said glass container (1) delimits an opening (4) providing access to the accommodation cavity (3) of said glass container (1), said injection operation being carried out using an injection head (11) located at a distance from the opening (4) of said glass container (1) and outside said glass container (1), said predetermined dose being injected as a spray cone (C) that is narrow enough relative to the opening (4) of the container (1) for substantially all of said predetermined dose to end up inside said accommodation cavity (3) of said glass container (1).

10. The method according to claim 9, wherein the injection head (11) is located substantially facing the opening (4) of said glass container (1) and at a distance (d) between 1 cm and 20 cm from said opening (4) during said injection step.

11. The method according to claim 9, wherein said spray cone (C) has an apex angle (0) between 0° and 5°.

12. The method according to claim 11, wherein said spray cone (C) has an apex angle (0) between 0° and 1°.

13. The method according to claim 9, wherein said injection operation is carried out while said glass container (1) is in motion relative to the injection head (11).

14. The method according to claim 13, which comprises a step of detecting the presence of said glass container (1) upstream from the injection head (11), previously to the injection operation, to synchronize the triggering of said injection operation with the arrival of said glass container (1) at the injection head (11).

15. The method according to claim 7, wherein said step of introducing the treatment liquid into the accommodation cavity (3) of said glass container (1) comprises a plurality of successive operations of injection of said predetermined dose of said treatment liquid.

16. The method according to claim 1, wherein the treatment substance comprises a sulphur compound and wherein the sulphur compound is selected from the group consisting of in solution and in a suspension in a volatile liquid.

17. The method according to claim 16, wherein said sulphur compound is an ammonium sulphate, said volatile liquid is water.

18. A method for dealkalizing an inner face (5) of a wall (2) of a glass container (1), which wall (2) delimits an accommodation cavity (3) for a product, said method being characterized in that it comprises:
   a step of supplying a borosilicate glass container (1), the inner face (5) of the wall (2) of which is at a temperature of at least 350° C.; and
   a step of introducing into said accommodation cavity (3), with said inner face (5) being at a temperature of at least 350° C., a treatment liquid containing a treatment substance designed to react under the effect of the heat from the inner face (5) of the wall (2) of said glass container (1) to bring about dealkalization of the glass;
   wherein said step for introducing said treatment liquid comprises at least one operation of injecting a predetermined dose of said treatment liquid; and
   wherein a volume of said predetermined dose of treatment liquid is chosen between 5 µL and 50 µL.

19. A method for dealkalizing an inner face (5) of a wall (2) of a glass container (1), which wall (2) delimits an accommodation cavity (3) for a product, said method being characterized in that it comprises:
   a step of supplying a borosilicate glass container (1), the inner face (5) of the wall (2) of which is at a temperature of at least 350° C.; and
   a step of introducing into said accommodation cavity (3), with said inner face (5) being at a temperature of at least 350° C., a treatment liquid containing a treatment substance designed to react under the effect of the heat from the inner face (5) of the wall (2) of said glass container (1) to bring about dealkalization of the glass;
   wherein said step for introducing said treatment liquid comprises at least one operation of injecting a predetermined dose of said treatment liquid, said injection operation being carried out using an injection head (11) located at a distance from the opening (4) of the container (1) and outside the latter,
   said injection head (11) being located substantially facing the opening (4) of said glass container (1) and at a distance (d) between 1 cm and 20 cm from said opening (4) during said injection step.

* * * * *